(No Model.)
A. DALLAS & O. P. AMICK.
FLUID PRESSURE BRAKE.
No. 572,871.  Patented Dec. 8, 1896.
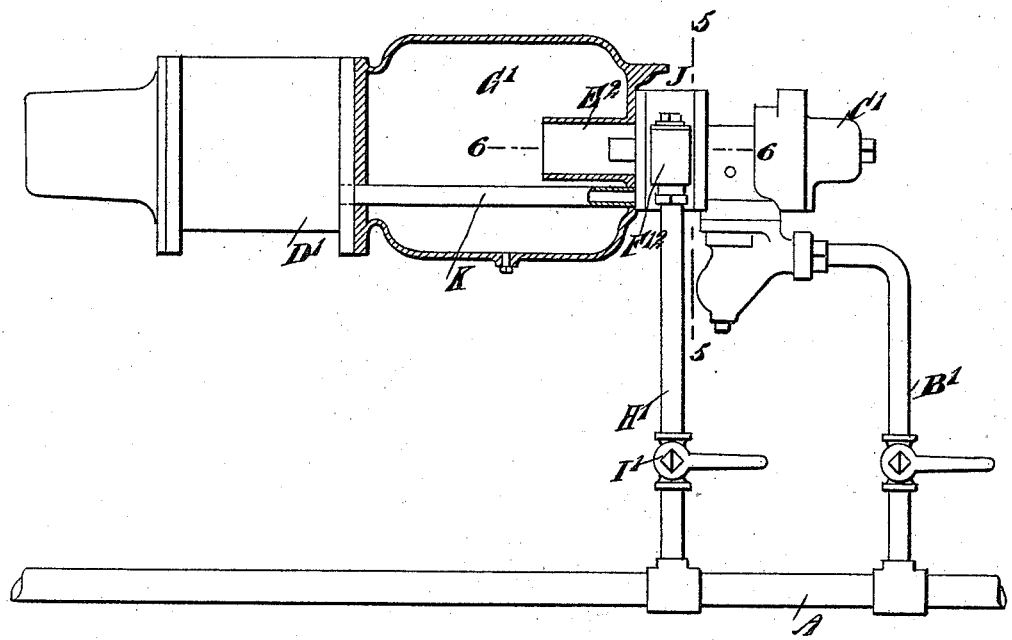
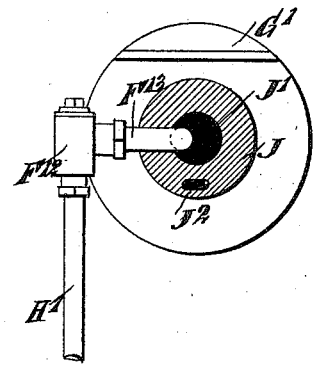
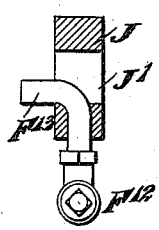
WITNESSES:
H. Walker
Thos. G. Hoster
INVENTORS:
A. Dallas
O. P. Amick
BY
ATTORNEYS.

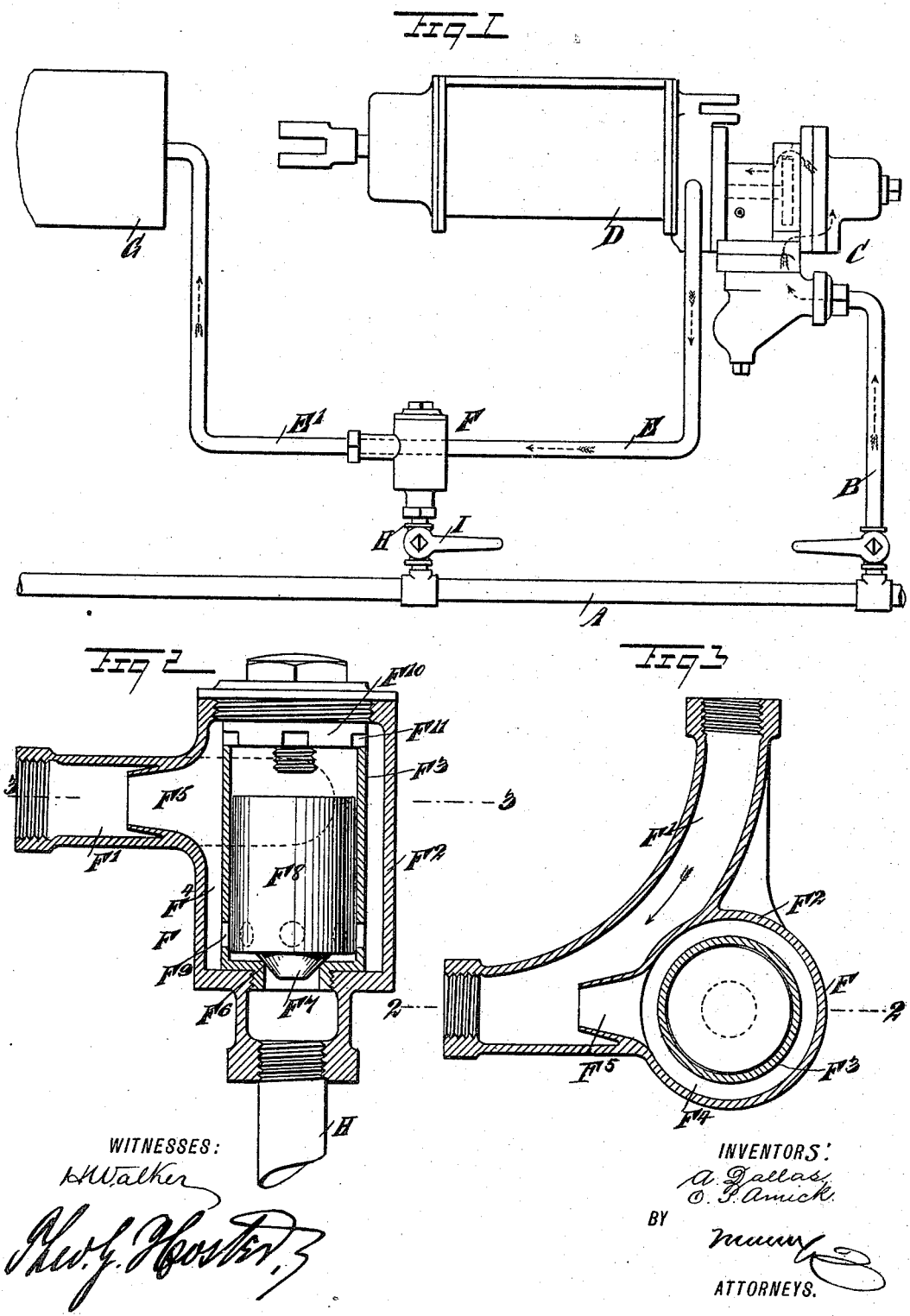

United States Patent Office.

ALEXANDER DALLAS AND OSCAR P. AMICK, OF HERINGTON, KANSAS.

FLUID-PRESSURE BRAKE.

SPECIFICATION forming part of Letters Patent No. 572,871, dated December 8, 1896.

Application filed March 4, 1896. Serial No. 581,803. (No model.)

*To all whom it may concern:*

Be it known that we, ALEXANDER DALLAS and OSCAR P. AMICK, of Herington, in the county of Dickinson and State of Kansas, have invented certain new and useful Improvements in Fluid-Pressure Brakes, of which the following is a full, clear, and exact description.

The object of the invention is to provide certain new and useful improvements in fluid-pressure brakes whereby an equal charging of the auxiliary reservoir and a prompt releasing of the brakes at the same time is obtained.

The invention consists of a feed-valve connected with a train-pipe, an auxiliary reservoir, and a triple valve for recharging the auxiliary reservoir at the time the brakes are releasing.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a plan view of the improvement arranged for brakes used on passenger-cars. Fig. 2 is an enlarged sectional side elevation of the feed-valve on the line 2 2 of Fig. 3. Fig. 3 is a sectional plan view of the same on the line 3 3 of Fig. 2. Fig. 4 is a sectional plan view of the improvement arranged for brakes used on freight-cars. Fig. 5 is a transverse section of the same on the line 5 5 of Fig. 4, and Fig. 6 is a sectional plan view of the same on the line 6 6 of Fig. 4.

The improvement, as illustrated in Figs. 1, 2, and 3, is applied to brakes for passenger-cars in which the train-pipe A is connected by a branch pipe B with a triple valve C, connected in the usual manner with a brake-cylinder D, and by a pipe E with a curved channel F', formed on the casing $F^2$ of a feed-valve F, said channel F' being connected by a pipe E' with an auxiliary reservoir G.

The under side of the casing $F^2$ of the feed-valve F is connected by a branch pipe H with the train-pipe A, and in the said branch pipe H is arranged a valve I for disconnecting the feed-valve F and train-pipe A whenever a car is cut out. The feed-valve F is provided with a bushing $F^3$, secured in the bottom of the casing $F^2$, as plainly illustrated in Fig. 2, said bushing forming with the casing an annular space $F^4$, leading to a nozzle $F^5$, opening into the channel F' next to the entrance of the pipe E'.

In the bottom of the bushing $F^3$ is formed a valve-seat $F^6$, in communication with the pipe H and adapted to receive a valve $F^7$, secured on the lower end of a piston $F^8$, fitted to slide in the bushing $F^3$, said piston $F^8$ normally closing openings $F^9$, connecting the interior of the bushing with the annular space $F^4$ at the same time the valve is seated on the seat $F^6$. The upper end of the bushing $F^3$ opens into the annular space $F^4$, and in order to limit the upward sliding of the piston $F^8$ we provide a plug $F^{10}$, screwing into the casing $F^2$ and engaging the upper open end of the bushing $F^3$ to hold the latter in place. On the inner end of the plug $F^{10}$ are formed recesses $F^{11}$, so that when the piston $F^8$ is in an uppermost position and abuts against the said plug communication is still established between the upper face of the piston $F^8$ and the annular space $F^4$ for air-pressure to act on said piston. The piston $F^8$ and its valve $F^7$ are usually weighted to five pounds, but we do not limit ourselves to this amount.

Now, as it is well known, on nearly all railroads the train-pipe pressure is maintained at seventy pounds, and consequently when the pressure in the auxiliary reservoir G reaches sixty-five pounds then the valve $F^7$ will close and seat itself on the seat $F^6$, leaving sixty-five pounds in the auxiliary reservoir G and seventy pounds in the train-pipe A. The two pressures in the train-pipe and auxiliary reservoir now equalize by air passing through the pipe B and triple valve C, through the feed-groove in the triple valve, to the pipe E, through the channel F' and pipe E' to the auxiliary reservoir G. Thus seventy pounds of pressure are in the train-pipe and a like amount in the auxiliary reservoir G, with the brakes off and the valve $F^7$ seated on the seat $F^6$.

In order to apply the brakes, a reduction of train-pipe pressure is made in the usual manner by the engineer manipulating the engineer's valve, so that the train-pipe pressure is reduced somewhat below that contained in the auxiliary reservoir G to cause the triple valve C to move into brake-applying position, whereby air from the auxiliary reservoir G can pass by the pipe E′, channel F′, pipe E, and triple valve C into and through the brake-cylinder, so as to apply the brakes.

In order to release the brakes, the engineer's valve is moved into full-release position, and the full-reservoir pressure of ninety pounds is turned into the train-pipe A, and the train-pipe pressure must increase at least five pounds before the valve $F^7$ will rise from its seat. This increase of train-pipe pressure will cause the triple valve to move back into brake-releasing position and allow air in the brake-cylinder D to escape through the usual exhaust-port. After the train-pipe pressure has increased over five pounds the valve $F^7$ and its piston $F^8$ is lifted from its seat, and air passes from the train-pipe A through the branch pipe H into the lower part of the bushing $F^3$ and through the openings $F^9$ into the annular space $F^4$, from which the air passes through the nozzle $F^5$ into the channel F′ and from the latter through the pipe E′ into the auxiliary reservoir G, thus recharging the latter instantly, and at the same time releasing the brakes promptly.

Now it will be seen that the brakes are not applied by the quick and high recharging of the auxiliary reservoir, as described, as the triple valve is not moved to a brake-applying position on account of the valve $F^7$ closing and retaining the greater pressure in the train-pipe, and thereby keeping the triple valve in a brake-releasing position. Furthermore, by connecting the feed-valve by the channel F′ and pipe E with the triple valve the flow of air through the nozzle $F^5$ fills the pipe E, thus preventing air from flowing back to the triple valve, and at the same time assists in a prompt release of the brakes by causing a suction through the channel F′ and pipe E from the triple valve.

The valve $F^7$ therefore being set, say, to five pounds will require for the purpose of raising it a five-pound preponderance of pressure in the train-pipe over that in the auxiliary reservoir; but the triple valve for the same work requires a mere preponderance of the train-pipe pressure over that in the auxiliary reservoir. These conditions being present, it may be understood that upon the manipulation of the engineer's valve to increase the pressure in the train-pipe the air expanding to increased pressure with gradual celerity contradistinguished from assuming instantaneously-increased volume will be first capable of actuating the triple valve and only capable of afterward actuating the valve $F^7$, owing to the fact that the triple valve is susceptible to the slightest influence of preponderance and the valve $F^7$ requires the positive pressure of a five-pound overbalance. The effect of this is the immediate release of the brakes upon the restoration of a maximum pressure in the train-pipe and, since it takes but a moment for the restoration to be complete, an immediately subsequent recharging of the auxiliary reservoir. Defective triple valves are most frequently such owing to a failure to sensitively respond to variations in the pressures controlling them, and this defect generally in practice manifests itself by a continued application of the brakes after the restoration of high pressure in the train-pipe. To recharge the auxiliary reservoir at the instant the restored train-pipe pressure must act to move the triple valves to a releasing position would be therefore to assist such triple valves as may be defective in their inaction at this period of the operation, because the pressure being barely preponderating in the train-pipe may not be capable of exerting the necessary preponderance of pressure on these frequently-occurring abnormal triple valves; but this is not the case with our invention. The tardiness characteristic of the operation of the valve $F^7$ permits the triple valve to experience the full force of the increase of pressure in the train-pipe while the condition in the pressure of the auxiliary reservoir is yet unchanged, and it is only at the instant following the releasing movement of the triple valve that the valve $F^7$ operates to open the auxiliary reservoir to communication with the increased pressure of the train-pipe. This condition being now established, the air will rush from the train-pipe into the pipe E′, guided to the auxiliary reservoir by the nozzle $F^5$, and thereby creating a partial vacuum in the pipe E, which draws the pressure in such pipe away from the triple valve, and thus we are enabled to apply to the triple valve the full force of the maximum pressure of the train-pipe against practically no pressure, or at least a very low pressure, on the auxiliary-reservoir side of the triple valve. Upon the closure of the valve $F^7$ normal conditions are again established.

In the arrangement shown in Figs. 4, 5, and 6 the train-pipe A′ is connected by the branch pipe B′ with a triple valve C′, connected by a casting J with one end of an auxiliary reservoir G′, on which is fastened a brake-cylinder D′, connected by a pipe K with a port $J^2$, formed in the casting J, said port $J^2$ leading to the triple valve C′. The casting J is formed with a central opening or port J′, connected at one end with the triple valve C′ and at its other end with a pipe $E^2$, extending a short distance into the auxiliary reservoir G′. A feed-valve $F^{12}$ is connected at its bottom by the branch pipe H′ with the train-pipe A′, and said branch pipe is provided with a valve I′, similar to the valve I previously mentioned in reference to Fig. 1. The nozzle $F^{13}$ of this feed-valve $F^{12}$ extends into and through the opening J′ of the casting J and into the pipe $E^2$, as plainly shown in Figs. 4 and 6, so that the air passing through the feed-valve and nozzle $F^{13}$ is discharged into the pipe E², to cause a suction of air from the triple valve through the opening J'. In recharging the auxiliary reservoir G' air passes from the train-pipe A' through the pipe H' and feed-valve F¹² into the nozzle F¹³, which discharges the air into the pipe E³, leading to the interior of the auxiliary reservoir G'. The feed-valve F¹², with the exception of the nozzle F¹³ and channel F', is the same as the one described and shown in Figs. 2 and 3.

It is understood that in all cases the valve F⁷ and its piston F⁸ work between two pressures, with the pressure from the auxiliary reservoir on the top of the piston F⁸ and with the pressure from the train-pipe on the bottom, as will be readily understood by reference to Fig. 2. Thus the valve F⁷ and its piston F⁸ are perfectly automatic in action, the valve gradually seating itself as the two pressures come within five pounds of being equal. It will further be seen that there are no springs to get out of order and but a single valve is employed for the purpose mentioned.

Having thus fully described our invention, we claim as new and desire to secure by Letters Patent—

1. The combination of a brake-cylinder, a train-pipe, a triple valve coöperating with the brake-cylinder and train-pipe, an auxiliary reservoir, a pipe leading from the auxiliary reservoir to the triple valve, a feed-valve casing in communication with the train-pipe and having a curved channel interposed between sections of the pipe from the auxiliary reservoir to the triple valve and the casing also having a nozzle projecting from an opening in the casing and into the curved channel, and a valve within the valve-casing, substantially as described.

2. A feed-valve having a casing, one end of which is formed with an opening and the casing also having an opening in one side and also having a curved channel adjacent to said opening and a nozzle projecting from the opening and into the channel, a bushing within the casing, the bushing forming a valve-seat and cylinder and having openings near each end, a piston movable in the bushing and susceptible to the simultaneous action of pressure from each opening, and a valve actuated by the piston, substantially as described.

3. A feed-valve having a casing with two fluid-openings, the casing also having a nozzle projecting from one fluid-opening and a channel adjacent to said fluid-opening and into which channel the nozzle projects, a bushing located within the casing and forming a valve-seat and cylinder, the bushing having an opening near the valve-seat, a cap engaging the end of the bushing opposite the opening therein, the cap having an opening forming a passage into the bushing, a piston operating in the bushing and susceptible to the simultaneous pressure of fluid from each fluid-opening, and a valve actuated by the piston, substantially as described.

4. A fluid-valve having a casing with two fluid-openings, a nozzle projecting from one fluid-opening, a channel into which the nozzle extends, a bushing within the casing and forming a valve-seat, the bushing also having an opening near the valve-seat, a piston operating within the bushing and susceptible to pressure by fluid at each fluid-opening, and a valve actuated by the piston, substantially as described.

5. In a fluid-pressure brake system, a train-pipe, an auxiliary reservoir, a brake-cylinder, a triple valve operated by a mere preponderance of fluid-pressure, means establishing communication between the triple valve and the auxiliary reservoir, means establishing communication between the triple valve and the train-pipe, and a feed-valve communicating with the means for establishing communication between the auxiliary reservoir and the triple valve and also communicating with the train-pipe, the feed-valve being loaded to normally close and to require for its operation a preponderance of fluid-pressure in the train-pipe greater than that required to operate the triple valve, substantially as described.

6. In a fluid-pressure brake system, an auxiliary reservoir, a brake-cylinder, a train-pipe, a triple valve, means establishing communication between the train-pipe and the triple valve, means establishing communication between the auxiliary reservoir and the triple valve and a feed-valve communicating with the means establishing communication between the auxiliary reservoir and the triple valve and with the train-pipe and establishing and controlling communication between such latter parts, the feed-valve requiring for its operation a preponderance of pressure in the train-pipe greater than that required to operate the triple valve, substantially as described.

7. In a fluid-pressure brake system, an auxiliary reservoir, a brake-cylinder, a train-pipe, a triple valve, means establishing communication between the triple valve and the auxiliary reservoir, means establishing communication between the triple valve and the train-pipe and a feed-valve establishing a controlled communication between the train-pipe and the means connecting the auxiliary reservoir and the triple valve, the feed-valve having a nozzle directing the flow of fluid from the train-pipe toward the auxiliary reservoir and away from the triple valve, substantially as described.

8. In a fluid-pressure brake system, a brake-cylinder, an auxiliary reservoir, a triple valve with which the auxiliary reservoir communicates, a train-pipe with which the auxiliary reservoir communicates, and a feed-valve controlling a communication between the train-pipe and the auxiliary reservoir, the feed-valve requiring for its operation a greater preponderance of pressure in the train-pipe than that which is required for the operation of the triple valve, substantially as described.

9. In a fluid-pressure brake system, an auxiliary reservoir, a brake-cylinder, a train-pipe, a triple valve having communication with the brake-cylinder and the train-pipe, means establishing communication between the auxiliary reservoir and the triple valve, and means establishing communication between the train-pipe and the means for connecting the auxiliary reservoir and the triple valve, the means leading from the train-pipe being capable of directing a current of fluid into the means connecting the auxiliary reservoir and the triple valve and in a direction toward the auxiliary reservoir and away from the triple valve, substantially as described.

ALEXANDER DALLAS.
     OSCAR P. AMICK.

Witnesses:
 M. K. DREESE,
 E. L. SORRELL.